United States Patent [19]

Kania et al.

[11] Patent Number: 5,359,005
[45] Date of Patent: Oct. 25, 1994

[54] STABLE, ONE-PACKAGE, NON-GELLED COATING COMPOSITION CURABLE UNDER AMBIENT CONDITIONS

[75] Inventors: Charles M. Kania, Natrona Heights; Padmanabhan Sundararaman, Allison Park; David T. McKeough; Gregory J. McCollum, both of Gibsonia; James B. O'Dwyer, Valencia, all of Pa.

[73] Assignee: PPG Industries, Inc., Pittsburgh, Pa.

[21] Appl. No.: 998,159

[22] Filed: Dec. 29, 1992

Related U.S. Application Data

[63] Continuation-in-part of Ser. No. 692,417, Apr. 29, 1991, abandoned.

[51] Int. Cl.$^5$ .................. C08F 265/00; C08F 283/02; C08F 291/12; C08K 5/29
[52] U.S. Cl. .................................. 525/203; 525/100; 525/123; 525/175; 525/176; 525/209; 525/440; 525/444; 525/446; 525/454; 525/457
[58] Field of Search ............... 525/100, 203, 209, 123, 525/175, 176, 440, 444, 446, 454, 457

[56] References Cited

U.S. PATENT DOCUMENTS

| | | | |
|---|---|---|---|
| Re. 29,586 | 3/1978 | Merlino et al. | 260/830 R |
| 3,249,622 | 5/1966 | Herrling et al. | 260/3067 |
| 4,187,258 | 2/1980 | Simon | 525/157 |
| 4,612,054 | 9/1986 | Hamon | 106/264 |
| 4,652,610 | 3/1987 | Dowbenko et al. | 525/100 |
| 4,940,761 | 7/1990 | Spinelli et al. | 525/195 |
| 4,954,559 | 9/1990 | Hartog et al. | 524/507 |
| 4,966,948 | 10/1990 | Godbey, Jr. et al. | 525/329.9 |
| 5,106,993 | 4/1992 | Kania | 548/967 |
| 5,164,467 | 11/1992 | Kania | 526/258 |

*Primary Examiner*—James J. Seidleck
*Assistant Examiner*—Thomas Hamilton, III
*Attorney, Agent, or Firm*—Linda Pingitore

[57] ABSTRACT

Stable, non-gelled, one-package coating compositions capable of being cured at ambient conditions to produce durable coatings comprising at least one polymer and/or oligomer having a molecular weight of at least about 100 and bearing at least two specific aziridine moieties, at least two specific carbodiimide moieties or combinations thereof and at least one polymer and/or oligomer having a molecular weight of at least about 100 and bearing at least two covalently blocked carboxylic acid moieties. Process for coating a substrate using such compositions are also claimed.

48 Claims, No Drawings

STABLE, ONE-PACKAGE, NON-GELLED COATING COMPOSITION CURABLE UNDER AMBIENT CONDITIONS

CROSS REFERENCE TO APPLICATIONS

This application is a continuation-in-part of copending application Ser. No. 07/692,417, filed Apr. 29, 1991, now abandoned.

BACKGROUND OF THE INVENTION

The present invention relates to stable, non-gelled, one-package coating compositions capable of being cured at ambient conditions to produce durable coatings comprising (1) at least one polymer and/or oligomer having a molecular weight of at least about 100 and bearing at least two specific aziridine moieties, at least two specific carbodiimide moieties, or combinations thereof, and (2) at least one polymer and/or oligomer having a molecular weight of at least about 100 and bearing at least two specific covalently blocked carboxylic acid moieties.

BRIEF DESCRIPTION OF PRIOR ART

In U.S. Pat. No. 4,612,054, Hamon discloses that polymers or compounds that have carboxylic acid groups containing at least one active hydrogen can be cured by using a carbodiimide in combination with ammonium hydroxide, an alkanolamine and/or metal dryers to obtain a composition having a controllable pot life. However, in the absence of the latter added ingredients, the pot life of the compositions is very short. Thus, in each of Examples Nos. 6 and 7, wherein an alkanolamine and driers were present, the composition had a long pot life. But, in Example No. 8 when the composition contained only the resin and the carbodiimide it had a pot life of about 30 seconds, rendering the composition useless as a one-package coating composition.

Godbey, Jr. et al in U.S. Pat. No. 4,966,948 prepare a coating composition containing an aqueous emulsion or dispersion polymer having an acid number of about 25 to about 250, a carbodiimide and a transition metal catalyst.

In the invention defined and claimed herein, on the other hand, we have found that effective crosslinking can be obtained at ambient temperature between (1) at least one polymer and/or oligomer bearing at least two specific aziridine moieties, at least two specific carbodiimide moieties, or combinations thereof, and (2) at least one polymer and/or oligomer bearing at least two specific covalently blocked carboxylic acid moieties. One-pack coating compositions can be prepared utilizing solely these two active components that are stable, do not gel and have a long pot life, for example, at least one day, generally at least one month, or even longer. The compositions can be applied, using any conventional coating means, for example, spraying, to a. substrate, particularly automotive bodies and parts, to form a durable coating thereon that is curable at ambient conditions having an excellent appearance and good resistance to chemicals and solvents. These excellent and desirable properties are obtained because of the use herein of the polymer and/or oligomer bearing covalently blocked carboxylic acid moieties rather than the corresponding free carboxylic acid groups containing active hydrogens.

SUMMARY OF THE INVENTION

The present invention is directed to stable, non-gelled, non-isocyanate coating compositions capable of being cured at ambient conditions to form coatings having high durability comprising:

(A) at least one polymer, oligomer or combinations thereof having a number average molecular weight of at least about 100 and bearing at least two moieties selected from the following groups:
(1) aziridine moieties defined by tile following structural formula:

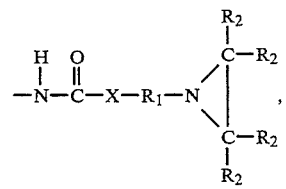

wherein

X represents O, S, NR, R representing H, alkyl having from one to 12 carbon atoms, or higher, or phenyl, $R_1$ represents $(CH_2)_{m1}$, $m_1$ being an integer ranging from 1 to 3 and $R_2$ represents H, $CH_3$ or combinations thereof, and/or (2) carbodiimide moieties defined by one of the following formulas:

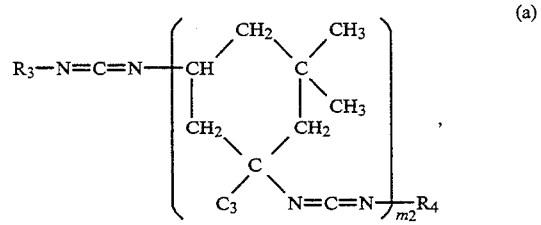

(a)

wherein $R_3$ and $R_4$ represent alkyl having one to four carbon atoms, cycloalkyl having from three to six carbon atoms, phenyl or substituted derivatives thereof and $m_2$ is an integer ranging from 1 to 20; and

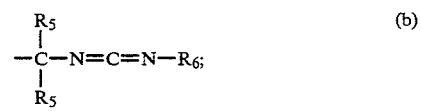

(b)

wherein $R_5$ represents alkyl having from one to 3 carbon atoms, and $R_6$ represents alkyl having from one to 20 carbon atoms, cycloalkyl having from three to six carbon atoms, phenyl or substituted derivatives thereof; and (B) at least one polymer, oligomer or combinations thereof having a number average molecular weight of at least about 100 and bearing at least two specific covalently blocked carboxylic acid moieties.

The present invention is also directed to processes for coating a substrate using such compositions, particularly for refinishing automobiles.

DETAILED DESCRIPTION OF THE INVENTION

The present invention is directed to stable, one-package, non-gelled, non-isocyanate coating compositions having a long pot life, particularly suitable for coating automotive bodies and parts, which are curable at ambient temperature resulting in coatings having high durability, comprising (A) at least one polymer, oligomer or combinations thereof having a number average molecular weight of at least about 100 and bearing at least two, preferably from two to about 75, moieties selected from the following groups:

(1) aziridine moieties defined by the following structural formula:

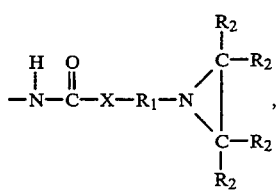

wherein
X represents O, S, NR, R representing H, alkyl having from 1 to 12 carbon atoms, or higher, or phenyl, preferably O,
$R_1$ represents $(CH_2)_{m1}$, $m_1$ being an integer ranging from 1 to 3, preferably 2, and
$R_2$ represents H, $CH_3$, or combinations thereof, preferably H and/or (2) carbodiimide moieties defined by one of the following structural formulas:

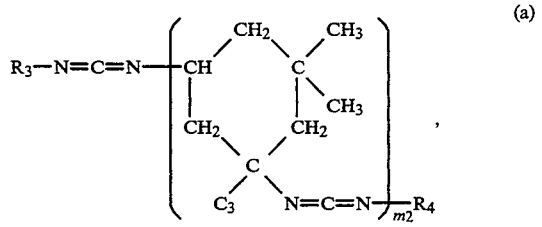

(a)

wherein
$R_3$ and $R_4$ represent alkyl having one to four carbon atoms, preferably four, cycloalkyl having from three to six carbon atoms, preferably six, phenyl or substituted derivatives thereof and $m_2$ is an integer ranging from 1 to 20, preferably 3, and

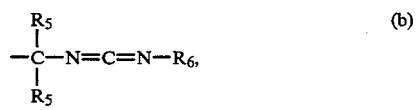

(b)

wherein
$R_5$ represents alkyl having from one to three carbon atoms, preferably one, and
$R_6$ represents alkyl having from 1 to 20 carbon atoms, preferably four, cycloalkyl having from three to six carbon atoms, preferably six, phenyl or substituted derivatives thereof, preferably cycloalkyls having six carbon atoms, and (B) at least one polymer, oligomer or combinations thereof having a number average molecular weight of at least about 100, preferably about 100 to about 20,000, and bearing at least two, preferably from two to about 75, covalently blocked carboxylic acid moieties.

In each of the components forming a part of the novel coating composition herein, the polymeric portion thereof can be, for example, acrylic, urethane, urea, polyester or any combination thereof. By "covalently blocked carboxylic acid moieties" of Component (B), we mean to include any polymer containing tile same but which will not chemically react with either the aziridine moiety or the carbodiimide moiety until the application of the two components to a substrate, at which time the covalent bond will be broken by some chemical reaction, such as hydrolysis, generating the corresponding free carboxylic acid for reaction with the aziridine and/or carbodiimide moieties to form the desired cured durable coating. Water vapor normally present in the atmosphere of the coating zone will be sufficient to break the covalently blocked carboxylic acid moiety. Examples of such polymers and oligomers carrying covalently blocked carboxylic acid moieties are polymers which bear anhydride, oxazolines or silyl ester groups. Of these, we prefer to use silyl ester moieties, especially those moieties defined by the following structural formula:

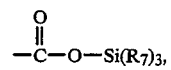

wherein $R_7$ represents methyl, ethyl, propyl, isopropyl, phenyl or combinations thereof, preferably methyl.

The novel coating composition herein is a non-gelled, one-pack coating system and is prepared by simply mixing the components. After mixing, the composition will have a pot life of at least one day, generally at least one month, or even longer. The components can be used in amounts such that the range of aziridine (equivalents) and/or carbodiimide (equivalents) to covalently blocked carboxylic acid (equivalents) is from about 3:1 to about 1:3, preferably about 1:1.

The coating composition defined and claimed herein can be applied to the substrate by any conventional techniques, such as spraying, brushing, dipping, rolling, etc., with the preferred method being spraying. Additionally, the components can be devolatilized and converted into sprayable powder form. The coating composition can be applied to many substrates, such as steel and aluminum, glass, plastic, concrete, etc. Additionally, the substrate can be primed or electrocoated prior to applying thereto the composition of this invention. The topcoat composition can be a pigmented one coat or, more preferably, a clear coat over a pigmented base coat.

The coating composition herein can also contain additional ingredients, such as organic or inorganic pigments or metallic flakes typically used in automobile refinishing, plasticizers, inert fillers, adhesion promoters, flow additives, thixotropes and additives for sag control and metallic flake orientation (sometimes referred to as microgel) and described in U.S. Pat. Nos. 4,025,474, 4,055,607, 4,075,141, 4,115,472, 4,147,688, 4,180,489, 4,242,384, 4,268,547 and 4,290,932, the disclosures of which are hereby incorporated herein by references, and other such formulating additives.

The coating compositions herein containing the defined components are generally used as solutions in organic solvents, although other forms can also be used, such as aqueous dispersions, non-aqueous dispersions and powder forms. Common examples of organic solvents that can be used include esters, such as butyl acetate; ketones, such as methyl isobutyl ketone; aromatic hydrocarbons, such as xylene; and glycol esters, such as propylene glycol methyl ether acetate. The solvents or carriers can be used in a range of about 20 to about 70 weight percent, based on the weight of the final coating composition.

The coating compositions defined and claimed herein are most useful for refinishing automobiles. The curing can be achieved most preferably at ambient conditions or accelerated by heat.

DESCRIPTION OF PREFERRED EMBODIMENTS

EXAMPLE 1

Preparation of Aziridine Polymeric Compound A

In a five-liter, four-neck round bottom flask equipped with a condenser, stirrer, thermometer and two addition funnels 832.0 grams of xylene were brought to reflux. At reflux a mixture of 480.0 grams of butyl acrylate, 288.0 grams of styrene, 336.0 grams of methyl methacrylate and 240.0 grams of m-TMI (dimethyl isopropenyl benzyl isocyanate, available from American Cyanamid), were added. A solution of 79.3 grams of t-butylperbenzoate in 64 grams of xylene was added and the reaction was held for 15 minutes at reflux (about 135° C.). Then over a three-hour period, two separate feeds of monomer and initiator were added. The monomer contained 336.0 grams of methyl methacrylate and 240.0 grams of m-TMI. The initiator feed contained 320.0 grams of xylene and 19.2 grams of t-butylperbenzoate. Upon completion of the feeds, the reaction was held for 30 minutes at reflux (about 132° C.). After this hold period, a solution of 96.9 grams of t-butylperbenzoate in 64 grams of xylene was added over a period of one hour and held at reflux for an additional hour. After this hold period 207.0 grams of hydroxy ethyl ethyleneimine were added and held 30 minutes at reflux (about 135° C.). 1.92 grams of dibutyl tin dilaurate were then added and held for an additional hour. Upon completion of this reaction, 138.0 grams of xylene were added.

The product obtained had a non-volatile content of 58.1 weight percent as determined at 110° C./one hour measurement, a Gardner viscosity of 4.9 stokes, a color value of 1, no NCO peak in the IR, a GPC peak molecular weight of 12,571, a number average molecular weight of 1562 and a theoretical aziridine solution equivalent weight of 1486.

EXAMPLE 2

Preparation of Aziridine Polymeric Compound B

In a five-liter, four-neck round bottom flask were placed 200.0 grams of T-1890L (isocyanurate of isophorone diisocyanate, available from HULS), and 427.0 grams of hexyl acetate. Over a one-hour period, 507.0 grams of hydroxy ethyl ethyleneimine were added while allowing the temperature to rise from 25° C. to 70° C. Upon completion of the addition, the temperature was raised to 85° C. and 1.91 grams of dibutyl tin dilaurate were added and the reaction held for one hour.

The product obtained had a non-volatile content of 67.4 weight percent as determined at 110° C./one hour measurement, a Gardner viscosity of 300 stokes, a color value of 3, a number average molecular weight of 1063, a theoretical aziridine solution equivalent weight of 503 and no NCO peak in the IR.

EXAMPLE 3

Preparation of Aziridine Polymeric Compound C

In a five-liter, four-neck round bottom flask equipped with a condenser, thermometer and two addition funnels, 640.0 grams of butyl acetate were brought to reflux (125° C.). At reflux and over a period of two hours a feed containing 384.0 grams of butyl acrylate, 288.0 grams of isobornyl methacrylate, 480.0 grams of methyl methacrylate, 192.0 grams of styrene and 192.0 grams of m-TMI was added along with a solution being added over a period of four hours containing 601.6 grams of butyl acetate and 115.2 grams of VAZO-67 [2,2'-azobis-(2-methylbutyronitrile), available from DuPont]. Upon completion of the above monomer feed, a solution of 192.0 grams of m-TMI, 96.0 grams of styrene and 96.0 grams of butyl acrylate was added over a period of two hours. Upon completion of this monomer feed and the above initiator feed, the reaction was held 30 minutes at reflux (125° C.). After the hold period, a solution of 32.0 grams of Lupersol 555-M60 (t-amylperacetate available from ATOCHEM) in 25.6 grams of butyl acetate was added over a period of 30 minutes and then held at reflux (123° C.) for one hour. 165.3 grams of hydroxy ethyl ethyleneimine were then added and held for 30 minutes at 130° C., after which 1.92 grams of dibutyl tin dilaurate were added and the reaction held at 130° C. for one hour.

The resulting product had a non-volatile content of 62.5 weight percent as determined at 110° C./one hour, a Gardner viscosity of 8.7 stokes, a color value of 1, a GPC peak molecular weight of 7939, a number average molecular weight of 2482, a theoretical aziridine solution equivalent weight of 1678 and no NCO peak in the IR.

EXAMPLE 4

Preparation of Trimethyl Silyl Blocked Acid Functional Polyester—Compound D 2692.0 grams of adipic acid, 2408.0 grams of hexanediol, 568.0 grams of trimethylol propane, three grams of triphenyl phosphate and three grams of butyl stannoic acid were charged into a 12-liter flask equipped with a steam condenser filled with saddles, a nitrogen sparge and stirrer. Heat was applied to this mixture and it was held at 200° C. while continuously removing water formed in the reactor. The progress of the reaction was followed by monitoring the acid value, and when the acid value was less than 10 the reaction was stopped and cooled to 120° C., after which 1200.0 grams of xylene were added. The resultant polyester had the following characteristics: solid content, 78 weight percent; acid value, 1.36; Gardner viscosity, K; color, 1; weight per gallon, 8.71; GPC number average molecular weight, 1222; and hydroxyl value 149.8.

1,170.0 grams of the above polyester (3.13 equivalents of hydroxyl), 558.0 grams of cyclohexane dicarboxylic acid and 93.5 grams of xylene were added to a five-liter flask equipped with stirrer, nitrogen sparge and a Dean Stark trap for azeotropic distillation of water. The mixture was heated to 180° C. while continuously removing water formed during the reaction (about 50 grams). The acid value stalled at 114. The yield of acid functional polyester was 1679.0 grams. It was then silylated as follows.

414.0 grams of hexamethyl disilazane was added slowly by way of a dropping funnel to 1679.0 grams of the above acid functional polyester (3.41 equivalents of acid) in a five-liter flask equipped with stirrer, nitrogen inlet and condenser, at 60° C. When the addition was complete, the mixture was heated to 85°–90° C. and held at that temperature until no carboxyl group absorption was detectable by IR. Solvent was removed by distillation under vacuum (less than 10 mm Hg). The non-volatile solid content was adjusted to 70 percent by adding 468.0 grams of a mixture containing equal weight amounts of xylene and methyl ethyl ketone. The yield of trimethylsilyl blocked acid functional polyester amounted to 2190.0 grams and was found to have a Gardner viscosity of K, a solution trimethylsilyl ester equivalent weight of 704 and a color of 1.

EXAMPLE 5

Preparation of Trimethyl Silyl Blocked Acid Functional Acrylic Polymer—Compound E 934.8 grams of propylene glycol methylether acetate (PM Acetate available from Dow Chemical Co.), 526.4 grams of butyl acetate and 1030.0 grams of isostearic acid (Emersol 875 available from Henkel Corporation) were introduced into a five-liter round bottom flask equipped with a stirrer, thermometer and condenser and heated to reflux (140° C.). Subsequently, a monomer mixture containing 1528.0 grams of styrene, 515.6 grams of methyl methacrylate, 1101.6 grams of hydroxy ethyl methacrylate and 514.4 grams of glycidyl methacrylate, an initiator mixture containing 73.2 grams of Vazo-67 and 743.6 grams of ethoxy ethyl propionate (EEP, a solvent available from Eastman Kodak) and a chain transfer mixture containing 109.6 grams of mercaptoethanol and 495.6 grams of butyl acetate were added separately and simultaneously to the reaction over a period of three hours. Next, a mixture containing 14.8 grams of Vazo-67, 246.4 grams of EEP and 165.2 grams of butyl acetate was added over a four-hour period. The reaction mixture was kept at reflux for an additional three hours, after which the acid value dropped to about 4.0 and a conversion of over 98 percent by weight of the reactants was obtained. The polymer obtained had the following characteristics: non-volatile solid content, 62.2 weight percent; Gardner viscosity, V+; acid value, 3.70; color, 200 APHA; hydroxyl value, 93.8; weight per gallon, 8.58; and a GPC number average molecular weight, 1537.

958.0 grams of the above hydroxy functional polymer (1.6 equivalents of hydroxyl) were introduced into a reactor and heated to 90° C. 258.0 grams of 4-methyl hexahydrophthalic anhydride (1.57 equivalents of anhydride) were added to the reaction over a period of 1 ½ hours. When addition was complete, the mixture was heated to 120° C. and held at that temperature until arthydride absorption in the IR disappeared. The acid functional polymer had an acid value of 69.5 and non-volatile solid content of 70.8.

1196.0 grams of the above acid functional polymer (1.48 equivalents of acid) were introduced into a reactor and heated to 60° C. Then 178.0 grams of hexamethyl disilazane were added over a period of one hour and the mixture was heated to 95°–100° C. and held at that temperature until no carboxylic acid absorption was detectable by IR. The reaction mixture was then cooled to 85° C. and the volatiles were distilled off under vacuum (53 mm Hg). 58.0 grams of xylene were added to obtain a theoretical non-volatile solid content of 80 percent, a solution trimethylsilyl ester equivalent weight of 804, and a viscosity of 330 stokes.

EXAMPLE 6

Preparation of Trimethyl Silyl Blocked Acid Functional Acrylic Polymer—Compound F 786.0 grams of hexyl acetate (Exxate 600 available from Eastman Kodak) were introduced into a five-liter round bottomed flask, equipped with paddle stirrer, thermometer and two dropping funnels, and heated to reflux. Subsequently a monomer mixture containing 441.6 grams of styrene, 691.2 grams of methyl methacrylate, 499.2 grams of isobornyl methacrylate and 288.0 grams of acrylic acid and an initiator mixture containing 160.0 grams of Lupersol-555 M60 and 435.2 grams of Exxate 600 were added separately and simultaneously to the reaction mixture over three hours. The reaction mixture was held at reflux for one hour. Two aliquots of Lupersol-555 M-60 (16.0 grams each) were added, with one-hour intervals between the two additions. After holding for one hour at reflux, 100 grams of volatiles were atmospherically distilled. Next 100.0 grams of Exxate 600 were added. The polymer solution obtained had the following properties: non-volatile solid content, 62.13 weight percent; Gardner viscosity, 2–10; color, 1; acid value, 64.4; and a GPC number average molecular weight, 4110.

300.0 grams of hexamethyl disilazane were added slowly by way of a dropping funnel to 2000.0 grams of the above acid functional acrylic polymer solution (2.3 equivalents of acid) in a five-liter flask, equipped with stirrer, condenser, thermometer and nitrogen inlet, at 60° C. When addition was complete, the reaction mixture was heated to 95°–100° C. and held at that temperature until the carboxylic acid group absorption disappeared in the IR spectrum. The volatiles were stripped off under vacuum (50 mm Hg). 190.0 grams of xylene were then added to achieve a theoretical non-volatile solid content of 70 weight percent, a Gardner viscosity of $Z_2$–$Z_3$ and a solution trimethylsilyl ester equivalent weight of 784.

A number of coating compositions were prepared using the above polymeric materials in admixture with other polymeric materials. The coating compositions so obtained were then used to coat a substrate. This is shown below in Examples 7 through 15.

EXAMPLE 7

| Components | Parts by Weight, Grams |
| --- | --- |
| Carbodiimide Resin[1] | 80.2 |
| Polysiloxane Solution[2] (flow control) | 1.0 |
| U.V. Absorber[3] | 3.0 |
| Additive[4] | 0.6 |
| Xylene (solvent) | 16.3 |
| Isobutyl Acetate (solvent) | 12.3 |
| Butyl Acetate (solvent) | 24.9 |
| UNOCAL TINNER 22461[5] | 7.4 |
| Lacolene[6] | 10.4 |
| Aromatic 100[7] (solvent) | 8.2 |
| Compound D from Example 4 | 85.7 |

[1]A solution of a multifunctional carbodiimide polymer available from Union Carbide as UNEL-XL20.
[2]Polysiloxane available from DOW Corning Corporation as DC 200, 135 csk. dissolved in xylene to give a 0.5 weight percent polysiloxane content.
[3]Available from Ciba-Geigy Corporation as TINUVIN 328.
[4]Slip and mar additive available from BYK - MALLINCKRODT as BYK-300.
[5]Aliphatic blend (Unocal Corp.).
[6]Lactol Mineral Spirits (Ashland Cop.).
[7]Aromatic hydrocarbon solvent (boiling point 155° C.).

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 85
D.O.I.: 35
Pencil Hardness: 5B
Solvent Resistance: Good

EXAMPLE 8

| Components | Parts by Weight, Grams |
| --- | --- |
| Compound A from Example 1 | 103.0 |
| Polysiloxane Solution[1] | 1.0 |
| U.V. Absorber[2] | 3.0 |
| Toluene | 18.7 |
| Propylene Glycol Methyl Ether Acetate | 31.2 |
| Ethylene Glycol Butyl Ether Acetate | 31.2 |
| Butyl Acetate | 41.4 |
| Ethyl-3-Ethoxy Propionate | 12.4 |
| Compound D from Example 4 | 54.6 |

[1]Same as in Example 7.
[2]Same as in Example 7.

The above clearcoat package was then spray applied to 24 gauge cold rolled steel panels (treated with BONDERITE 40, primed with DP-40/401, a two-component epoxy primer from FPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 93
D.O.I.: 80
Pencil Hardness: 5B
Solvent Resistance: Fair

EXAMPLE 9

| Components | Parts by Weight, Grams |
| --- | --- |
| Compound B from Example 2 | 57.2 |
| Polysiloxane Solution[1] | 1.0 |
| U.V. Absorber[2] | 3.0 |
| Toluene | 18.7 |
| Propylene Glycol Methyl Ether Acetate | 31.2 |
| Ethylene Glycol Butyl Ether Acetate | 31.2 |
| Butyl Acetate | 41.4 |
| Ethyl-3-Ethoxy Propionate | 12.4 |
| Compound D from Example 4 | 88.9 |

[1]Same as in Example 7.
[2]Same as in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON-®Universal Basecoat from PPG INDUSTRIES INC., PPG FINISHES). The clearcoat film was allowed to cure at ambient conditions. The resulting coating was found to have the following properties after a one-week cure time:
20 Degree Gloss: 89
D.O.I.: 55
Pencil Hardness: 4B
Solvent Resistance: Excellent

EXAMPLE 10

| Components | Parts by Weight, Grams |
| --- | --- |
| Carbodiimide Resin[1] | 70.4 |
| Polysiloxane[2] | 1.0 |
| U.V. Absorber[3] | 3.0 |
| Additive[4] | 0.6 |
| Xylene | 19.3 |
| Isobutyl Acetate | 14.5 |
| Butyl Acetate | 29.4 |
| UNOCAL T6HINNER 22461[5] | 8.8 |
| Lacolene[6] | 12.3 |
| Aromatic 100[7] | 9.7 |
| Compound E from Example 5 | 81.0 |

Each of [1, 2, 3, 4, 5, 6] and [7] is the same as used in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 91
D.O.I.: 75
Pencil Hardness: 2B
Solvent Resistance: Excellent

EXAMPLE 11

| Components | Parts by Weight, Grams |
| --- | --- |
| Compound 8 from Example 2 | 55.1 |
| Polysiloxane Solution[1] | 1.0 |
| U.V. Absorber[2] | 3.0 |
| Toluene | 18.7 |
| Propylene Glycol Methyl Ether Acetate | 31.2 |
| Ethylene Glycol Butyl Ether Acetate | 31.2 |
| Butyl Acetate | 41.4 |
| Ethyl-3-Ethoxy Propionate | 12.4 |
| Compound E from Example 5 | 91.7 |

[1]Same as in Example 7.
[2]Same as in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 92
D.O.I.: 55
Pencil Hardness: B
Solvent Resistance: Excellent

EXAMPLE 12

| Components | Parts by Weight, Grams |
|---|---|
| Compound C from Example 3 | 109.0 |
| Polysiloxane Solution[1] | 1.0 |
| U.V. Absorber[2] | 3.0 |
| Toluene | 18.7 |
| Propylene Glycol Methyl Ether Acetate | 31.2 |
| Ethylene Glycol Butyl Ether Acetate | 31.2 |
| Butyl Acetate | 41.4 |
| Ethyl-3-Ethoxy Propionate | 12.4 |
| Compound E from Example 5 | 49.4 |

[1]Same as in Example 7.
[2]Same as in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 86
D.O.I.: 65
Pencil Hardness: 4B
Solvent Resistance: Fair

EXAMPLE 13

| Components | Parts by Weight, Grams |
|---|---|
| Carbodiimide Resin[1] | 77.8 |
| Polysiloxane[2] | 1.0 |
| U.V. Absorber[3] | 3.0 |
| Additive[4] | 0.6 |
| Xylene | 16.3 |
| Isobutyl Acetate | 12.3 |
| Butyl Acetate | 24.9 |
| UNOCAL T6HINNER 22461[5] | 7.4 |
| Lacolene[6] | 10.4 |
| Aromatic 100[7] | 8.2 |
| Compound E from Example 5 | 87.3 |

Each of [1, 2, 3, 4, 5, 6 and 7] is the same as used in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 90
D.O.I.: 60
Pencil Hardness: 2B
Solvent Resistance: Excellent

EXAMPLE 14

| Components | Parts by Weight, Grams |
|---|---|
| Compound B from Example 2 | 59.1 |
| Polysiloxane Solution[1] | 1.0 |
| U.V. Absorber[2] | 3.0 |
| Toluene | 18.7 |
| Propylene Glycol Methyl Ether Acetate | 31.2 |
| Ethylene Glycol Butyl Ether Aceate | 31.2 |
| Butyl Acetate | 41.4 |
| Ethyl-3-Ethoxy Propionate | 12.4 |
| Compound F from Example 6 | 88.0 |

[1]Same as in Example 7.
[2]Same as in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 93
D.O.I.: 60
Pencil Hardness: 3B
Solvent Resistance: Excellent

EXAMPLE 15

| Components | Parts by Weight, Grams |
|---|---|
| Compound A from Example 1 | 105.0 |
| Polysiloxane Solution[1] | 1.0 |
| U.V. Absorber[2] | 3.0 |
| Toluene | 18.7 |
| Propylene Glycol Methyl Ether Acetate | 31.2 |
| Ethylene Glycol Butyl Ether Acetate | 31.2 |
| Butyl Acetate | 41.4 |
| Ethyl-3-Ethoxy Propionate | 12.4 |
| Compound F from Example 6 | 51.9 |

[1]Same as in Example 7.
[2]Same as in Example 7.

The above clearcoat package was then spray applied to 24 gauge cold rolled steel panels (treated with BONDERITE 40, primed with DP-40/401, a two-component epoxy primer from PPG INDUSTRIES INC., PPG FINISHES, and basecoated with DELTRON ® Universal Basecoat from PPG INDUSTRIES INC., PPG FINISHES). The clearcoat film was allowed to cure at ambient conditions. The resulting coating was found to have the following properties after a one-week cure time:
20 Degree Gloss: 93
D.O.I.: 65
Pencil Hardness: 5B
Solvent Resistance: Excellent Additional examples were carried out identical to each of Examples Nos- 7 to 15, inclusive, above except that instead of using the polymers bearing at least two covalently blocked carboxylic acid moleties the same polymers were used but in each case carrying the corresponding free carboxylic acid moleties instead. The results of all of the runs are summarized in the table below. The latter corresponding Examples are identified by the lower subscript "a". Also included in the table is the pot life of each of the coating compositions used in the examples. There is additionally included in the table data relating to the pot life and solvent resistance of a commercial coating composition, DAU-82 DELTRON ® CLEAR COAT A (isocyanate cured polyol available from PPG INDUSTRIES INC., PPG Finishes) as a control using the materials indicated; the amounts are in parts by weight.

TABLE SHOWING COMPARATIVE PROPERTIES

| Example No. | Polymer Containing Aziridine Used | Polymer Containing Carbodiimide Used | Polymer Containing Covalently Blocked Carboxylic Acid Moieties Used | Pot Life[1] | 20 Degree Gloss | D.O.I.[2] | Pencil Hardness | Solvent Resistance[3] |
|---|---|---|---|---|---|---|---|---|
| Control | — | — | — | 18 hrs. | 91 | 65 | 5B | Fair |
| 7 | — | UNEL-XL20 | D | >2 days | 85 | 35 | 5B | Good |
| 7a | — | UNEL-XL20 | M | <5 min. | — | — | — | — |
| 8 | A | — | D | >2 days | 93 | 80 | 5B | Fair |
| 8a | A | — | M | <10 min. | — | — | — | — |
| 9 | B | — | D | >2 days | 89 | 55 | 4B | Excellent |
| 9a | B | — | M | <5 min. | — | — | — | — |
| 10 | — | UNEL-XL20 | E | >2 days | 91 | 75 | 2B | Excellent |
| 10a | — | UNEL-XL20 | M | <5 min. | — | — | — | — |
| 11 | B | — | E | >2 days | 92 | 55 | B | Excellent |
| 11a | B | — | M | <2 min. | — | — | — | — |
| 12 | C | — | E | >2 days | 86 | 65 | 4B | Fair |
| 12a | C | — | M | <30 min. | — | — | — | — |
| 13 | — | UNEL-XL20 | F | >2 days | 90 | 60 | 2B | Excellent |
| 13a | — | UNEL-XL20 | M | <5 min. | — | — | — | — |
| 14 | B | — | F | >2 days | 93 | 60 | 3B | Excellent |
| 14a | B | — | M | <5 min. | — | — | — | — |
| 15 | A | — | F | >2 days | 93 | 65 | 5B | Excellent |
| 15a | A | — | M | <10 min. | — | — | — | — |

[1]Time to room temperature gel or useful spray time as indicated.
[2]Depth-of-Image.
[3]Gasoline Spot Resistance to Softening.
M = Same polymer as in preceding Example except that instead of carrying at least two covalently blocked carboxylic acid moieties, the polymer carries the corresponding free carboxylic acid moieties.

From the data in the above table, it is readily apparent that the coating compositions containing polymers carrying the aziridine or carbodiimide moieties and a polymer carrying covalently blocked carboxylic acid moieties have a long pot life, that is, at least two days, suitable for use as one-package coating compositions, and that the coatings obtained are durable and would be desirable for automobile refinishing. However, when coating compositions were prepared that are identical thereto, except that the polymer carrying covalently blocked carboxylic acid moieties was replaced with an identical polymer carrying the corresponding free carboxylic acid moieties, in each case the pot life was less than 30 minutes, generally less than five to 10 minutes, rendering them not suitable for the desired application.

Among the particularly useful embodiments of the invention are compositions comprising both one or more polymers containing aziridine moieties and one or more polymers containing carbodiimide moieties, in combination with a polymer containing blocked carboxylic acid moieties. Such compositions provide coatings having a unique combination of properties, including good hardness, appearance and gasoline resistance, as well as the necessary pot life to permit their use in automobile refinishing. That such compositions have a useful pot life and yet cure to coatings having such properties is unexpected in view of the known reactivities of the various moieties involved. The following are examples of such compositions.

EXAMPLES 16–21

In these examples the carbodiimide resin employed is a multifunctional carbodiimide polymer having a number average molecular weight of 1603, structurally the same as that used in the above examples but with residual monomeric residues stripped off; it is available from Union Carbide as UNEL-XL27HS. These examples were carried out in the manner of the above examples,

| Example | 16 | 17 | 18 | 19 | 20 | 21 |
|---|---|---|---|---|---|---|
| Carbodiimide Resin | 28.45 | 23.06 | 35.59 | 29.99 | 37.11 | 31.15 |
| Additive[1] | 1.0 | 1.0 | 1.0 | 1.0 | 1.0 | 1.0 |
| U.V. Absorber[2] | 3.0 | 3.0 | 3.0 | 3.0 | 3.0 | 3.0 |
| Light Stabilizer[3] | 2.0 | 2.0 | 2.0 | 2.0 | 2.0 | 2.0 |
| Toluene | 16.78 | 16.7 | 15.24 | 14.84 | 12.68 | 11.8 |
| Propylene Glycol Methyl Ether Acetate | 27.94 | 27.82 | 25.36 | 24.72 | 21.08 | 19.64 |
| 2-Butoxy Ethanol Acetate | 27.84 | 27.72 | 25.26 | 24.64 | 21.0 | 19.58 |
| Butyl Acetate | 37.04 | 36.9 | 33.62 | 32.78 | 27.94 | 26.04 |
| 1-Ethyl-3-Ethoxy Propionate | 11.28 | 11.24 | 10.24 | 10.0 | 8.52 | 7.94 |
| Compound A from Example 1 | 35.07 | 31.02 | 43.85 | 40.46 | 45.76 | 42.55 |
| Compound E from Example 5 | 72.39 | 82.35 | 67.65 | 79.37 | — | — |
| Anhydride-functional Acrylic Polymer[4] | — | — | — | — | 82.71 | 97.76 |

[1]Same as in Example 7.
[2]Same as in Example 7.
[3]Available from Ciba-Geigy as CGL-123.
[4]Copolymer of acrylic monomers and maleic anhydride with a number average molecular weight of about 2500; made as described in Example 1 of U.S. Pat. No. 4,798,746.

The pot life of each of the above compositions was tested and each was cured and tested, as in the above examples, and found to have the following properties after 5 days cure time.

| Example | Pot Life | 20 Degree Gloss | D.O.I. | Pencil Hardness | Solvent Resistance |
|---|---|---|---|---|---|
| 16 | 4 hours | 73 | 30 | 6B | Good |
| 17 | 4 hours | 87 | 45 | 4B | Excellent |
| 18 | 4 hours | 84 | 50 | 5B | Excellent |
| 19 | 2 days | 87 | 60 | 4B | Excellent |
| 20 | 2 days | 93 | 75 | 6B | Excellent |

| Example | Pot Life | 20 Degree Gloss | D.O.I. | Pencil Hardness | Solvent Resistance |
|---|---|---|---|---|---|
| 21 | >2 days | 83 | 60 | 4B | Excellent |

According to the provisions of the patent statutes, there are described above the invention and what are now considered to be its best embodiments. However, within the scope of the appended claims, it is to be understood that the invention may be practiced otherwise than as specifically described hereinabove.

What is claimed:

1. Stable, non-gelled, coating compositions capable of being cured at ambient conditions to form coatings having excellent durability comprising:
   (A) at least one polymer, oligomer or combinations thereof having a number average molecular weight of at least about 100 and bearing at least two moieties selected from the following groups:
      (1) aziridine moieties defined by the following structural formula:

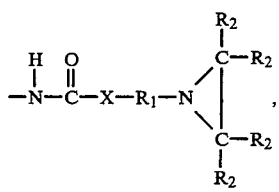

wherein
   X represents O, S, NR, R representing H, alkyl having from 1 to 12 carbon atoms, or higher, or phenyl,
   $R_1$ represents $(CH_2)_{m_1}$ $m_1$ being an integer ranging from 1 to 3 and
   $R_2$ represents H, $CH_3$ or combinations thereof, and/or
      (2) carbodiimide moieties defined by one of the following structural formulas:

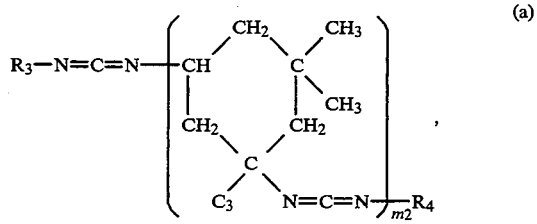

wherein
   $R_3$ and $R_4$ represent alkyl having one to four carbon atoms, cycloalkyl having from three to six carbon atoms, phenyl or substituted derivatives thereof and $m_2$ is an integer ranging from 1 to 20; and

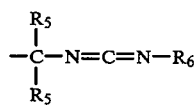

wherein
   $R_5$ represents alkyl having from one to three carbon atoms and $R_6$ represents alkyl having from 1 to 20 carbon atoms, cycloalkyl having from three to six carbon atoms, phenyl or substituted derivatives thereof; and
   (B) at least one polymer, oligomer or combinations thereof having a number average molecular weight of at least about 100 and bearing at least two silyl ester blocked carboxylic acid moieties.

2. Compositions according to claim 1 wherein Component (A) is an acrylic polymer.

3. Compositions according to claim 1 wherein Component (B) is an acrylic polymer.

4. Compositions according to claim 1 wherein Components (A) and (B) are each acrylic polymers.

5. Compositions according to claim 1 wherein Component (A) is a urethane polymer.

6. Compositions according to claim 1 wherein Component (B) is a urethane polymer.

7. Compositions according to claim 1 wherein Components (A) and (B) are each urethane polymers.

8. Compositions according to claim 1 wherein Component (A) is a urea polymer.

9. Compositions according to claim 1 wherein Component (B) is a urea polymer.

10. Compositions according to claim 1 wherein Components (A) and (B) are each urea polymers.

11. Compositions according to claim 1 wherein Component (A) is a polyester polymer.

12. Compositions according to claim 1 wherein Component (B) is a polyester polymer.

13. Compositions according to claim 1 wherein Components (A) and (B) are each polyester polymers.

14. Compositions according to claim 1 wherein the number average molecular weight of Component (A) is from about 100 to about 20,000.

15. Compositions according to claim 1 wherein the number average molecular weight of Component (B) is from about 100 to about 20,000.

16. Compositions according to claim 1 wherein Component (A) comprises a polymer bearing aziridine moieties and a polymer bearing carbodiimide moieties.

17. Compositions according to claim 1 wherein the range of aziridine and/or carbodiimide (equivalents) to blocked carboxylic acid (equivalents) is about 3:1 to about 1:3.

18. Compositions according to claim 1 wherein the range of aziridine and/or carbodiimide (equivalents) to blocked carboxylic acid equivalents is about 1:1.

19. Compositions according to claim 1 wherein Component (A) is (A)(1).

20. Compositions according to claim 1 wherein Component (A) is defined by (A)(2)(a).

21. Compositions according to claim 1 wherein Component (A) is defined by (A)(2)(b).

22. Compositions according to claim 1 wherein said silyl ester moiety is defined by the following structural formula:

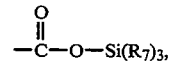

wherein $R_7$ represents methyl, ethyl, propyl, isopropyl, phenyl or combinations thereof.

23. Compositions according to claim 22 wherein $R_7$ represents methyl.

24. Compositions according to claim 1 wherein X represents O; $R_1$ represents $(CH_2)_2$; $R_2$ represents H; $R_3$ and $R_4$ represent alkyl having one to four carbon atoms; $R_5$ represents $CH_3$; $R_6$ represents alkyl having four carbon atoms; $m_1$ is the integer 2; and $m_2$ is the integer 3.

25. A process for coating a substrate which comprises applying to said substrate a stable, non-gelled, coating composition capable of being cured at ambient conditions to form coatings thereon having excellent durability comprising:

(A) at least one polymer, oligomer or combinations thereof having a number average molecular weight of at least about 100 and bearing at least two moieties selected from the following groups:

(1) aziridine moieties defined by the following structural formula:

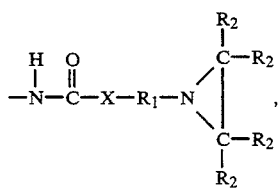

wherein

X represents O, S, NR, R representing H, alkyl having from 1 to 12 carbon atoms, or higher, or phenyl, $R_1$ represents $(CH_2)_{m1}$, $m_1$ being an integer ranging from 1 to 3 and $R_2$ represents H, $CH_3$ or combinations thereof, and/or (2) carbodiimide moieties defined by one of the following structural formulas:

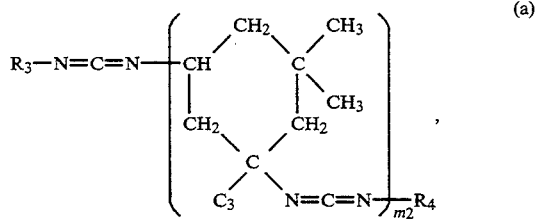

wherein $R_3$ and $R_4$ represent alkyl having one to four carbon atoms, cycloalkyl having from three to six carbon atoms, phenyl or substituted derivatives thereof and $m_2$ is an integer ranging from 1 to 20; and

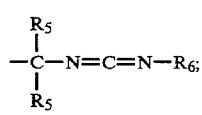

wherein $R_5$ represents alkyl having from one to three carbon atoms and $R_6$ represents alkyl having from 1 to 20 carbon atoms, cycloalkyl having from three to six carbon atoms, phenyl or substituted derivatives thereof; and (B) at least one polymer, oligomer or combinations thereof having a number average molecular weight of at least about 100 and bearing at least two silyl ester blocked a carboxylic acid moieties.

26. The process of claim 25 wherein Component (A) is an acrylic polymer.

27. The process of claim 25 wherein Component (B) is an acrylic polymer.

28. The process of claim 25 wherein Components (A) and (B) are each acrylic polymers.

29. The process of claim 25 wherein Component (A) is a urethane polymer.

30. The process of claim 25 wherein Component (B) is a urethane poller.

31. The process of claim 25 wherein Components (A) and (B) are each urethane pollers.

32. The process of claim 25 wherein Component (A) is a urea poller.

33. The process of claim 25 wherein Component (B) is a urea polymer.

34. The process of claim 25 wherein Components (A) and (B) are each urea polymers.

35. The process of claim 25 wherein Component (A) is a polyester polymer.

36. The process of claim 25 wherein Component (B) is a polyester polymer.

37. The process of claim 25 wherein Components (A) and (B) are each polyester polymers.

38. The process of claim 25 wherein the number average molecular weight of Component (A) is from about 100 to about 20,000.

39. The process of claim 25 wherein the number average molecular weight of Component (B) is from about 100 to about 20,000.

40. The process of claim 25 wherein Component (A) comprises a polymer bearing aziridine groups and a polymer bearing carbodiimide groups.

41. The process of claim 25 wherein the range of aziridine and/or carbodiimide (equivalents) to blocked carboxylic acid (equivalents) is about 3:1 to about 1:3.

42. The process of claim 25 wherein the range of aziridine and/or carbodiimide (equivalents) to blocked carboxylic acid equivalents is about 1:1.

43. The process of claim 25 wherein Component (A) is (A) (1).

44. The process of claim 25 wherein Component (A) is defined by (A)(2)(a).

45. The process of claim 25 wherein Component (A) is defined by (A)(2)(b).

46. The process of claim 25 wherein said silyl ester moiety is defined by the following structural formula:

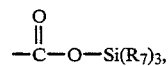

wherein $R_7$ represents methyl, ethyl, propyl, isopropyl, phenyl or combinations thereof.

47. The process of claim 46 $R_7$ represents methyl.

48. The process of claim 47 wherein X represents O; R1 represents $(CH_2)_2$; $R_2$ represents H; $R_3$ and $R_4$ represent alkyl having one to four carbon atoms; $R_5$ represents $CH_3$; $R_6$ represents alkyl having four carbon atoms; $m_1$ is the integer 2; and $m_2$ is the integer 3.

* * * * *

UNITED STATES PATENT AND TRADEMARK OFFICE
CERTIFICATE OF CORRECTION

PATENT NO. : 5,359,005
DATED : October 25, 1994
INVENTOR(S) : Charles M. Kania et al.

It is certified that error appears in the above-indentified patent and that said Letters Patent is hereby corrected as shown below:

Column 18, claim 30, line 14, change "poller" to --polymer--.

Column 18, claim 31, line 16, change "pollers" to --polymers--.

Column 18, claim 32, line 18, change "poller" to --polymer--.

Signed and Sealed this

Thirteenth Day of June, 1995

Attest:

BRUCE LEHMAN

*Attesting Officer*          *Commissioner of Patents and Trademarks*